United States Patent
Miura et al.

(10) Patent No.: US 8,037,835 B2
(45) Date of Patent: Oct. 18, 2011

(54) TOOL STORAGE STRUCTURE OF SADDLE-RIDE TYPE SMALL BOAT

(75) Inventors: Takayoshi Miura, Saitama (JP); Kyohei Hosoya, Saitama (JP); Jun Kusakari, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 309 days.

(21) Appl. No.: 12/393,516

(22) Filed: Feb. 26, 2009

(65) Prior Publication Data

US 2009/0229509 A1    Sep. 17, 2009

(30) Foreign Application Priority Data

Mar. 13, 2008  (JP) .................................. 2008-064953

(51) Int. Cl.
*B63B 35/73* (2006.01)
(52) U.S. Cl. .................................................. 114/55.57
(58) Field of Classification Search .............. 114/55.57
See application file for complete search history.

(56) References Cited

U.S. PATENT DOCUMENTS

| | | | | |
|---|---|---|---|---|
| 5,964,172 A | * | 10/1999 | Ikeda .......................... | 114/55.57 |
| 6,227,130 B1 | * | 5/2001 | Tsumiyama et al. ...... | 114/55.57 |
| 6,598,551 B2 | * | 7/2003 | Nakajima et al. .......... | 114/55.57 |
| 7,014,240 B2 | * | 3/2006 | Nagashii ..................... | 296/37.1 |

FOREIGN PATENT DOCUMENTS

JP    2003-072676 A    3/2003

* cited by examiner

*Primary Examiner* — Stephen Avila
(74) *Attorney, Agent, or Firm* — Birch, Stewart, Kolasch & Birch, LLP

(57) ABSTRACT

A tool storage structure of a saddle-ride type small boat capable of reducing the number of parts while suppressing noise generation. In a saddle-ride type small boat driven by an occupant who straddles the seat formed of a front seat and a rear seat on the boat body, a frame of the rear seat includes an insertion portion to be inserted into the rear lower portion of the front seat. The insertion portion is integrally provided with the tool storage portion for storing tools. The number of parts needed to form the tool storage portion is reduced and noise generation is suppressed.

16 Claims, 4 Drawing Sheets

TOOL STORAGE STRUCTURE OF SADDLE-RIDE TYPE SMALL BOAT

CROSS-REFERENCE TO RELATED APPLICATIONS

The present application claims priority under 35 USC 119 to Japanese Patent Application No. 2008-064953 filed on Mar. 13, 2008 the entire contents of which are hereby incorporated by reference.

1. Field of the Invention

The present invention relates to a tool storage structure of a saddle-ride type small boat.

2. Description of Background Art

Generally, a tool storage structure of a saddle-ride type small boat is known for providing a peripheral edge of a rear tray (47) around the peripheral edge of an opening (46) of the boat body, and further for providing a bottom surface (29a) of a rear seat (29) of a straddling type seat (27) on the rear tray (47) so as to be kept stationary for accommodating a storage box (48a) for tool storage. See, for example, paragraph 0020 in JP-A No. 2003-72676.

In the generally employed tool storage structure of a saddle-ride type small boat, the use of the rear tray (47) which is regarded as being unnecessary for the tool storage has been required. This, results in an increased number of parts. The rear tray (47) is held with the bottom surface (29a) of the rear seat (29) so as to be kept stationary. The rear tray (47) which is not sufficiently held with the rear seat (29) will be oscillated to generate noise.

SUMMARY AND OBJECTS OF THE INVENTION

It is an object of an embodiment of the present invention to provide a tool storage structure of a saddle-ride type small boat capable of reducing the number of parts while suppressing noise generation.

For the purpose of establishing the aforementioned object, according to an embodiment of the present invention, a tool storage structure of a saddle-ride type small boat driven by an occupant who straddles a seat on a boat body is provided. The seat is formed of a front seat and a rear seat, and a frame of the rear seat includes an insertion portion to be inserted into a rear lower portion of the front seat, and the insertion portion is integrally provided with a tool storage portion for storing a tool.

In the tool storage structure of the saddle-ride type small boat according to the present invention, a frame of the rear seat has an insertion portion to be inserted into the rear lower portion of the front seat. The insertion portion may be used as a fixing portion to the boat body, or a positioning portion and a fixing portion of the rear seat with respect to the front seat.

The insertion portion is integrally provided with the tool storage portion for storing tools, thus eliminating the need of adding the extra part for storing the tool. This makes it possible to reduce the number of parts.

The tool storage portion is integrally formed with the insertion portion to suppress noise generation.

The tool storage structure of the saddle-ride type small boat reduces the number of parts while suppressing noise generation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
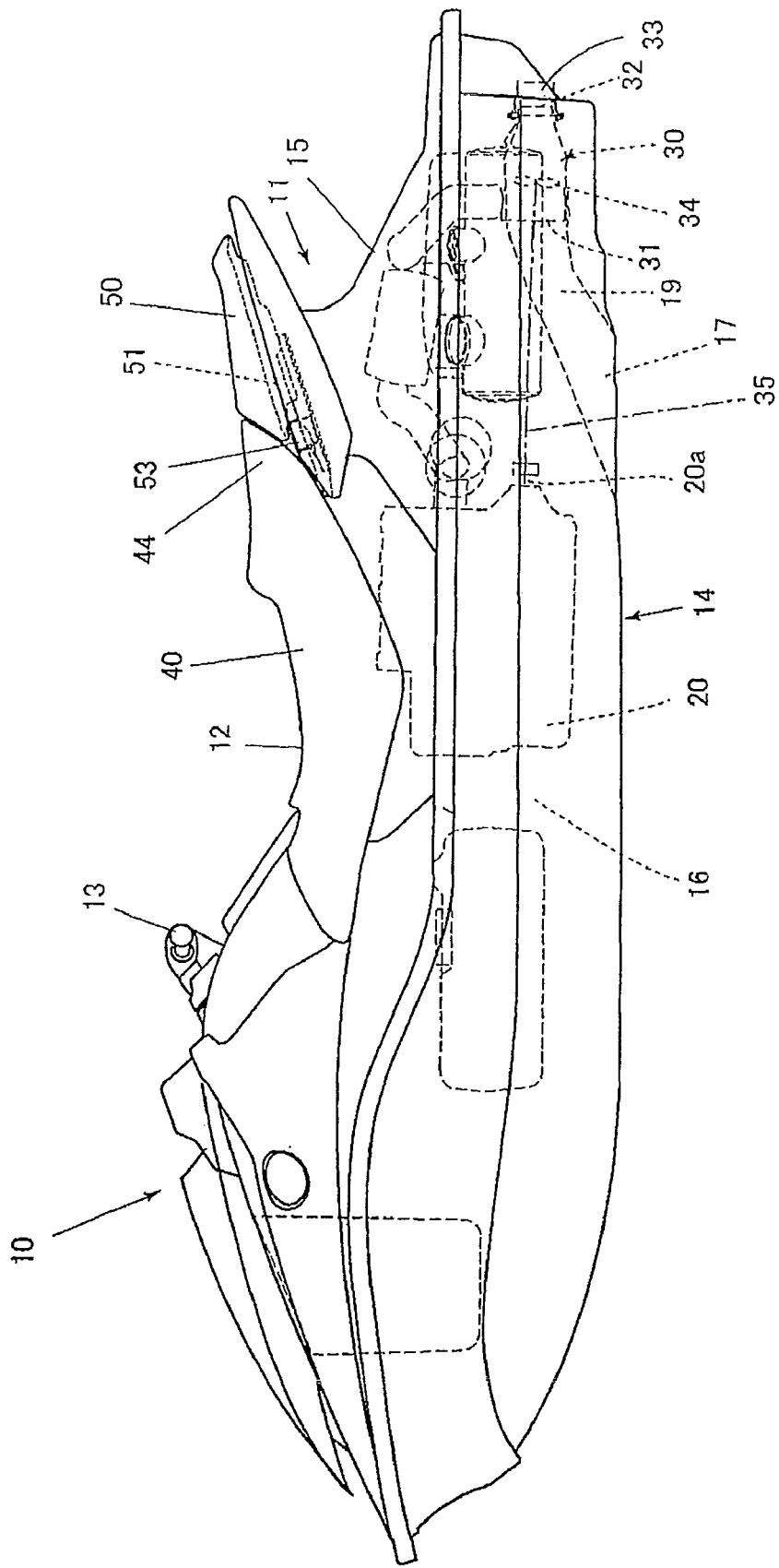
FIG. 1 is a side view schematically showing an example of a saddle-ride type small boat which employs the tool storage structure according to an embodiment of the present invention.

An embodiment of a tool storage structure of a saddle-ride type small boat according to the present invention will be described referring to the drawings.

Figure 2:
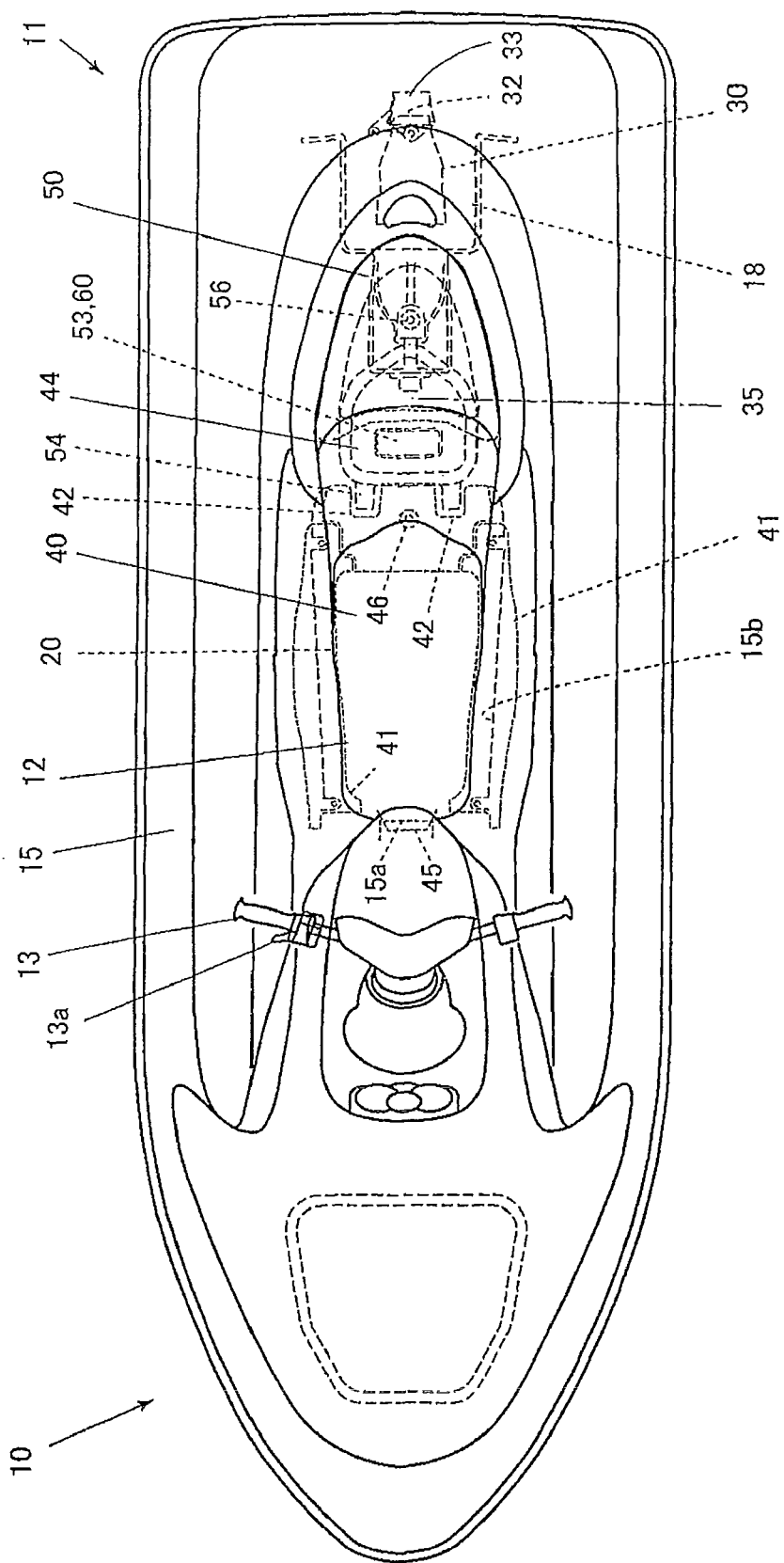
FIG. 2 is a schematic plan view shown in FIG. 1.

FIG. 1 is a side view of a saddle-ride type small boat which employs the tool storage structure according to the embodiment of the present invention. FIG. 2 is a schematic plan view.

Referring to FIGS. 1 and 2, a small boat 10 is a saddle-ride type small boat which allows an occupant to be seated on a seat 12 on a boat body 11 and to drive by operating a steering handlebar 13 with a throttle lever 13a.

The boat body 11 has a floating structure having an interior space 16 formed by connecting a hull 14 to a deck 15. An engine 20 is mounted on the hull 14, and a jet pump 30 (jet propulsion pump) as propulsion means to be driven by the engine 20 is disposed to the rear of the hull 14 in the interior space 16.

A flow passage 19 extending from an intake port 17 open to the bottom of the boat to a pump chamber 18 (see FIG. 2) is formed to the rear of the hull 14. The jet pump 30 communicated with the flow passage 19 is disposed inside the pump chamber 18.

The jet pump 30 includes an opening 31 communicated with the flow passage 19, a jet port 32 and a nozzle 33 through which water is blown to the rear of the boat body, and an impeller 34 disposed inside the flow passage extending from the opening 31 to the jet port 32. A shaft 35 of the impeller 34 is connected to an output shaft 20a of the engine 20. When the engine 20 drives the impeller 34 to rotate, water taken through the intake port 17 is blown from the jet port 32 via the nozzle 33 to drive the boat body 11 forward. The engine speed of the engine 20, that is, the driving force derived from the jet pump 30 is defined by the rotating operation of the throttle lever 13a. The nozzle 33 is associated with the steering handlebar 13 with a wire (not shown) so as to be rotatably operated to change the course.

Figure 3:
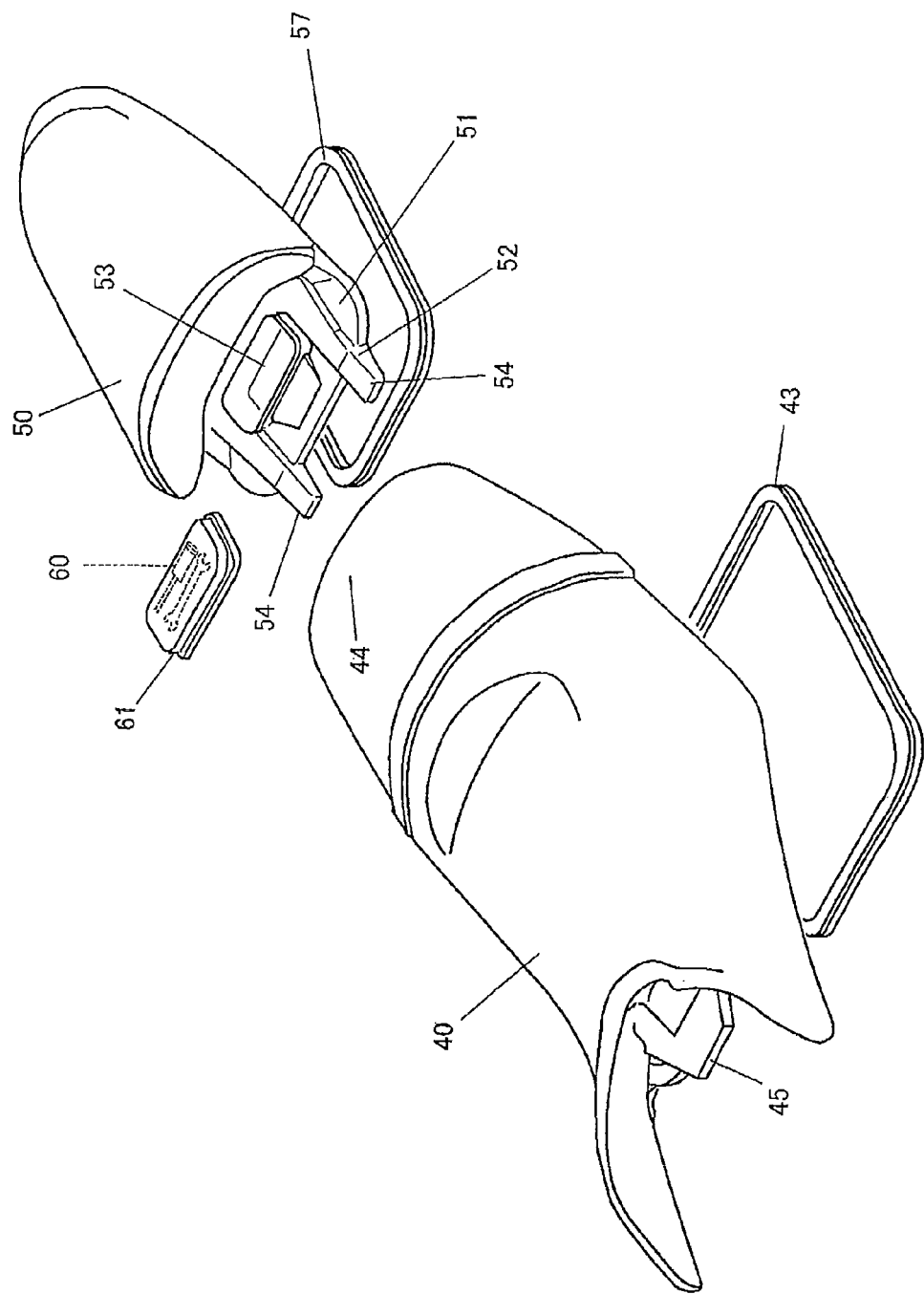
FIG. 3 is a perspective view of the seat.
Figure 4A:
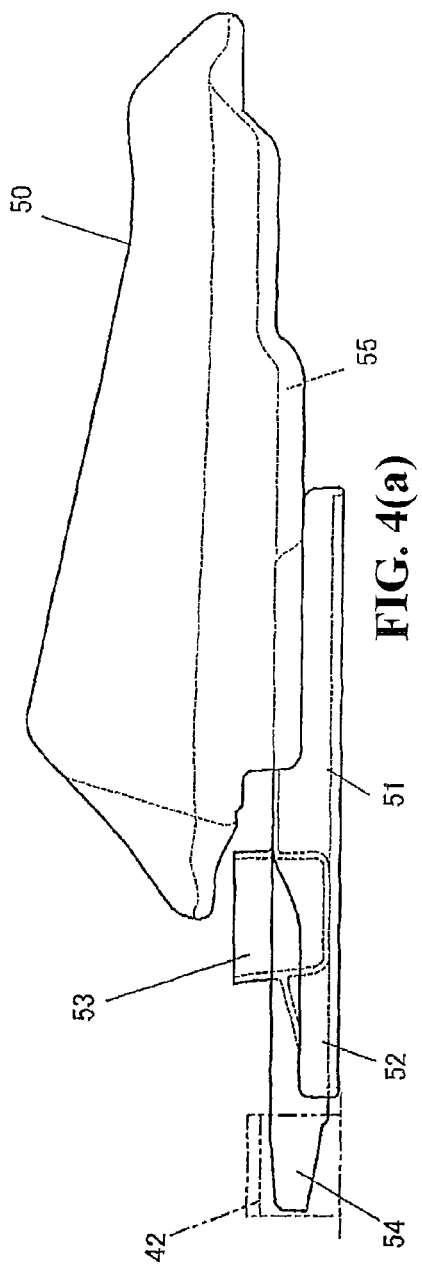
FIG. 4(a) is a schematic side view.
Figure 4B:
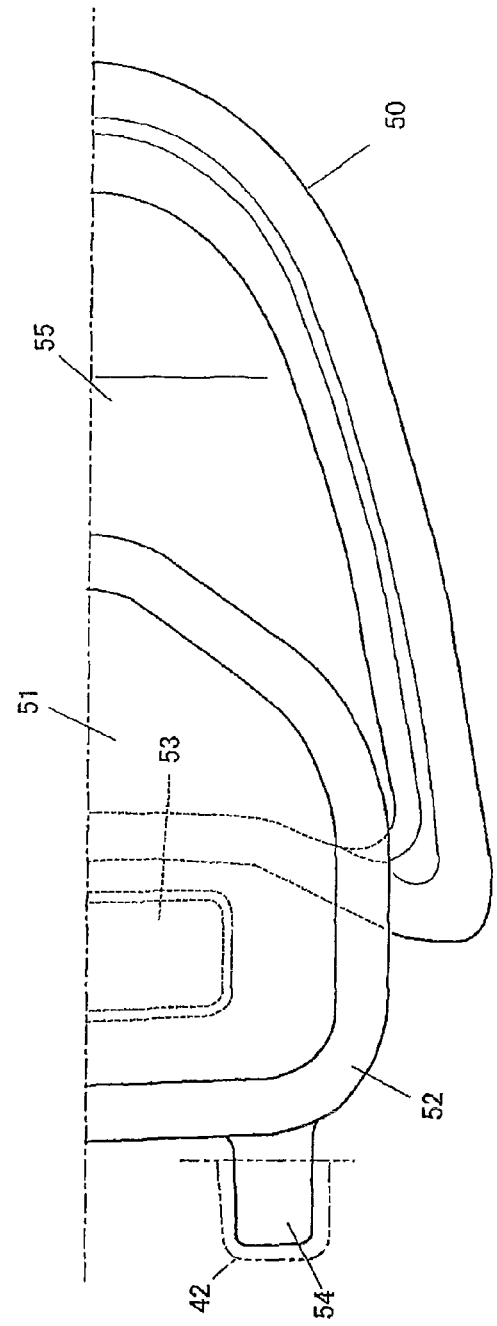
FIG. 4(b) is a schematic bottom view of FIG. 4(a) (only a half section is shown).

FIG. 3 is a perspective view of the seat. FIGS. 4(a) and 4(b) illustrate the rear seat, wherein FIG. 4(a) is a schematic side view, and FIG. 4(b) is a schematic bottom view of FIG. 4(a) (only a half section is shown).

Referring to FIGS. 1 to 3, the tool storage structure of the saddle-ride type small boat includes the seat 12 formed of a front seat 40 and a rear seat 50. A frame 51 of the rear seat 50 includes an insertion portion 52 to be inserted into the rear lower portion of the front seat 40. The insertion portion 52 is integrally provided with a tool storage portion 53 for storing a tool 60.

The front seat 40 includes a protruding portion 45 to the front of the frame 41, and lock means 46 interposed between the rear portion of the frame 41 and the deck 15 as shown in FIGS. 2 and 3.

The protruding portion 45 is inserted into a reception portion (portion fit with the protruding portion 45) 15a (see FIG. 2) formed in the deck 15.

The lock means 46 may be formed as known lock means, for example, by combining the latch (45b) and the lock member (44b) as described, for example, in paragraph 0019 of JP-A No. 2003-72676.

The front seat 40 is detachably mounted to the deck 15 by inserting the protruding portion 45 at the front portion into the reception portion 15a formed in the deck 15 to lock the rear portion with the lock means 46.

An opening 15b sealed with the front seat 40 is formed in the deck 15. The engine 20 may be subjected to the maintenance work through the opening 15b by removing the front seat 40.

The insertion portion 52 of the frame 51 of the rear seat 50, which is inserted into the rear lower portion of the front seat 40 is provided with a pair of protrusions 54, 54 protruding forward.

In addition, recess portions 42 to be fit with the protrusions 54 are formed in the rear portion of the frame 41 of the front seat 40 or the deck 15.

Lock means 56 (see FIG. 2) is provided between a rear portion 55 of the frame 51 of the rear seat 50 and the deck 15.

The lock means 56 may be formed as the known lock means, for example, by combining the latch (45b) and the lock member (44b) as described, for example, in the paragraph 0019 of JP-A No. 2003-72676.

The rear seat 50 is detachably mounted to the deck 15 by inserting the protrusions 54, 54 of the insertion portion 52 into the recess portions 42, 42, and by locking the rear portion 55 of the frame 51 with the lock means 56.

Referring to FIG. 3, a seal member 43 is interposed between the opening 15b of the deck 15 and the front seat 40, and a seal member 57 is interposed between the opening of the deck 15 and the rear seat 50.

The tool storage portion 53 has a box shape with the upper surface opened, and positioned to be sealed with the rear portion 44 of the front seat 40 when the insertion portion 52 is inserted into the rear lower portion of the front seat 40.

In the embodiment, the tool 60 in a bag-like (pouch-like or box-like) tool case 61 is stored in the tool storage portion 53.

When the front seat 40 and the rear seat 50 are mounted as described above, the tool 60 stored in the tool storage portion 53 has the upper portion sealed with the rear portion 44 of the front seat 40, which may be prevented from jumping out of the tool storage portion 53.

The tool storage structure of the saddle-ride type small boat as described above provides the following effects.

The frame 51 of the rear seat 50 is provided with the insertion portion 52 to be inserted into the rear lower portion of the front seat 40, which serves as the fixing portion to the boat body 11 or the positioning portion and the fixing portion of the rear seat with respect to the front seat.

The insertion portion 52 is integrally provided with the tool storage portion 53 for storing the tool 60, thus eliminating the need of adding the extra part for storing the tool 60. This makes it possible to reduce the number of parts.

The tool storage portion 53 is integrally provided with the insertion portion 52 to suppress noise generation.

The tool storage structure of the saddle-ride type small boat is capable of reducing the number of parts while suppressing noise generation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tool storage structure of a saddle-ride type small boat driven by an occupant who straddles a seat on a boat body, comprising:
    said seat includes a front seat and a rear seat;
    a rear frame of the rear seat includes a rear insertion portion to be inserted into a rear lower portion of the front seat, said rear insertion portion including protrusions extending in a forward direction for mounting the rear seat relative to the rear lower portion of the front seat; and
    a tool storage portion integrally formed in the insertion portion for storing tools, said tool storage portion being a box shape with an upper surface being opened and being positioned to be sealed with the rear lower portion of the front seat when the protrusions are inserted into the rear lower portion of the front seat.

2. The tool storage structure of a saddle-ride type small boat according to claim 1, wherein the front seat includes a frame with a protruding portion projecting therefrom for mounting the front seat relative to the boat.

3. The tool storage structure of a saddle-ride type small boat according to claim 2, and further including locking means interposed between a rear portion of the frame and a deck of the boat for securing the front seat relative to the boat.

4. The tool storage structure of a saddle-ride type small boat according to claim 2, wherein the protruding portion is positioned within a reception portion formed in a deck of the boat for positioning the protruding portion relative to the boat.

5. The tool storage structure of a saddle-ride type small boat according to claim 3, wherein the front seat is detachable mounted relative to the boat by positioning the protruding portion into a reception portion formed in the deck and securing the locking means relative to the deck.

6. The tool storage structure of a saddle-ride type small boat according to claim 1, and further including a rear locking means interposed between a rear portion of the rear frame and a deck of the boat for securing the rear seat relative to the boat.

7. The tool storage structure of a saddle-ride type small boat according to claim 1, wherein the rear seat is detachable mounted relative to the boat by positioning the protrusions extending in a forward direction into recess portions formed in the deck and securing the rear locking means relative to the deck.

8. The tool storage structure of a saddle-ride type small boat according to claim 1, wherein the tool storage portion is integrally provided in the insertion portion for reducing the number of parts and for suppressing noise generation.

9. A tool storage structure for a vehicle, comprising:
    a front seat;
    a rear seat;
    a rear frame of the rear seat includes a rear insertion portion to be inserted into a rear lower portion of the front seat, said rear insertion portion includes protrusions extending in a forward direction for mounting the rear seat relative to the rear lower portion of the front seat; and
    a tool storage portion integrally formed in the insertion portion for storing tools, said tool storage portion being a box shape with an upper surface being opened and being positioned to be sealed with the rear lower portion of the front seat when the protrusions are inserted into the rear lower portion of the front seat.

10. The tool storage structure for a vehicle according to claim 9, wherein the front seat includes a frame with a protruding portion projecting therefrom for mounting the front seat relative to the vehicle.

11. The tool storage structure for a vehicle according to claim 10, and further including locking means interposed between a rear portion of the frame and a deck of the vehicle for securing the front seat relative to the vehicle.

12. The tool storage structure for a vehicle according to claim 10, wherein the protruding portion is positioned within a reception portion formed in a deck of the vehicle for positioning the protruding portion relative to the vehicle.

13. The tool storage structure for a vehicle according to claim 11, wherein the front seat is detachable mounted relative to the vehicle by positioning the protruding portion into a reception portion formed in the deck and securing the locking means relative to the deck.

14. The tool storage structure for a vehicle according to claim 9, and further including a rear locking means interposed between a rear portion of the rear frame and a deck of the vehicle for securing the rear seat relative to the vehicle.

15. The tool storage structure for a vehicle according to claim 9, wherein the rear seat is detachable mounted relative to the vehicle by positioning the protrusions extending in a forward direction into recess portions formed in the deck and securing the rear locking means relative to the deck.

16. The tool storage structure for a vehicle according to claim 9, wherein the tool storage portion is integrally provided in the insertion portion for reducing the number of parts and for suppressing noise generation.

* * * * *